United States Patent
Bonnier et al.

(10) Patent No.: US 10,379,612 B1
(45) Date of Patent: Aug. 13, 2019

(54) ELECTRONIC DEVICE WITH GAZE TRACKING SYSTEM

(71) Applicant: Apple Inc., Cupertino, CA (US)

(72) Inventors: Nicolas P. Bonnier, Campbell, CA (US); William Riedel, San Francisco, CA (US); Jiaying Wu, San Jose, CA (US); Martin P. Grunthaner, Los Altos Hills, CA (US); Seyed Hesameddin Najafi Shoushtari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/826,367

(22) Filed: Nov. 29, 2017

Related U.S. Application Data

(60) Provisional application No. 62/435,358, filed on Dec. 16, 2016.

(51) Int. Cl.
*G06F 3/01* (2006.01)
*G06F 3/16* (2006.01)
*G02B 27/01* (2006.01)
*G02B 27/00* (2006.01)

(52) U.S. Cl.
CPC .............. *G06F 3/013* (2013.01); *G06F 3/167* (2013.01); *G02B 27/0093* (2013.01); *G02B 27/0172* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 9,179,833 B2 | 11/2015 | Narasimha-Iyer et al. | |
| 9,684,373 B2 | 6/2017 | Nomura et al. | |
| 9,715,781 B2 | 7/2017 | Lyons et al. | |
| 2013/0169560 A1* | 7/2013 | Cederlund | G06F 3/013 345/173 |
| 2014/0204029 A1* | 7/2014 | Lopez | G06F 3/013 345/163 |
| 2014/0226131 A1* | 8/2014 | Lopez | G06F 1/1626 351/210 |
| 2014/0320397 A1 | 10/2014 | Hennessey et al. | |
| 2016/0134863 A1* | 5/2016 | Horesh | H04N 17/002 348/78 |

* cited by examiner

*Primary Examiner* — Joseph R Haley
(74) *Attorney, Agent, or Firm* — Treyz Law Group, P.C.; G. Victor Treyz; Joseph F. Guihan

(57) ABSTRACT

An electronic device may have a display and a gaze tracking system. Control circuitry in the electronic device can produce a saliency map in which items of visual interest are identified among content that has been displayed on a display in the electronic device. The saliency map may identify items such as selectable buttons, text, and other items of visual interest. User input such as mouse clicks, voice commands, and other commands may be used by the control circuitry in identifying when a user is gazing on particular items within the displayed content. Information on a user's actual on-screen point of gaze that is inferred using the saliency map information and user input can be compared to measured eye position information from the gaze tracking system to calibrate the gaze tracking system during normal operation of the electronic device.

9 Claims, 5 Drawing Sheets

ELECTRONIC DEVICE WITH GAZE TRACKING SYSTEM

This application claims the benefit of provisional patent application No. 62/435,358, filed Dec. 16, 2016, which is hereby incorporated by reference herein in its entirety.

BACKGROUND

This relates generally to electronic devices and, more particularly, to electronic devices with gaze tracking systems.

Devices such as head-mounted displays and computers may have gaze tracking systems that monitor the gaze of a user's eyes. Information on a user's gaze may be used as input for controlling the operation of a head-mounted display or other device.

Due to movement of a head-mounted display relative to a user's eyes or other changes in the operating environment of an electronic device with gaze detection, gaze detection accuracy may be degraded. If care is not taken, this can lead to difficulties in controlling the operation of the electronic device using gaze information.

SUMMARY

An electronic device such as a head-mounted display device or other device with a display may have a gaze tracking system. The gaze tracking system may be an optical gaze tracking system that has components such as a light source that emits beams of light that reflect off of a user's eyes and a camera for gathering eye position information from images of the user's eyes.

Control circuitry in the electronic device can produce a saliency map for content being displayed on the display. The saliency map may be used to identify items of visual interest within the displayed content. The saliency map may identify items such as selectable buttons, text, and other items of visual interest. User input such as mouse clicks, voice commands, and other commands may be used in conjunction with gaze detection system output in determining which objects are being viewed by a user. This allows the control circuitry to accurately determine the location of the user's actual on-screen point of gaze.

Information on the on-screen point of gaze that is determined in this way can be compared to a point of gaze location associated with the measured eye position information from the gaze tracking system. This allows the control circuitry to perform real time calibration operations on the gaze tracking system.

DETAILED DESCRIPTION

Electronic devices may be provided with displays and gaze tracking systems. The gaze tracking systems may gather information on a user's eyes such as information on the location of the centers of a user's pupils, information on corneal reflection locations and other reflections, and other eye position information associated with the direction in which the user is currently gazing. The direction in which the user is currently gazing can be used in determining the location on the display at which the user is focused (the user's on-screen point of gaze). The user's point of gaze on the display can be used as an input such as an input in a video game, an input in a media creation application, an input for a web browser or business application, or an input in any other suitable type of software running on the electronic device.

Electronic devices that include displays and gaze tracking systems may include, for example, head-mounted displays (e.g., head-mounted devices such as virtual reality or augmented reality glasses), cellular telephones, tablet computers, head-up displays in vehicles and other environments, laptop computers, desktop computers, televisions, wristwatches, and other suitable electronic equipment. In devices such as head-mounted displays, the general location of a user's eyes will be relatively constant during operation, facilitating accurate eye tracking. In general, however, any suitable electronic device may be provided with a gaze tracking (eye tracking) system (e.g., a stand-alone computer, a head-up display, a portable device, etc.).

Figure 1:
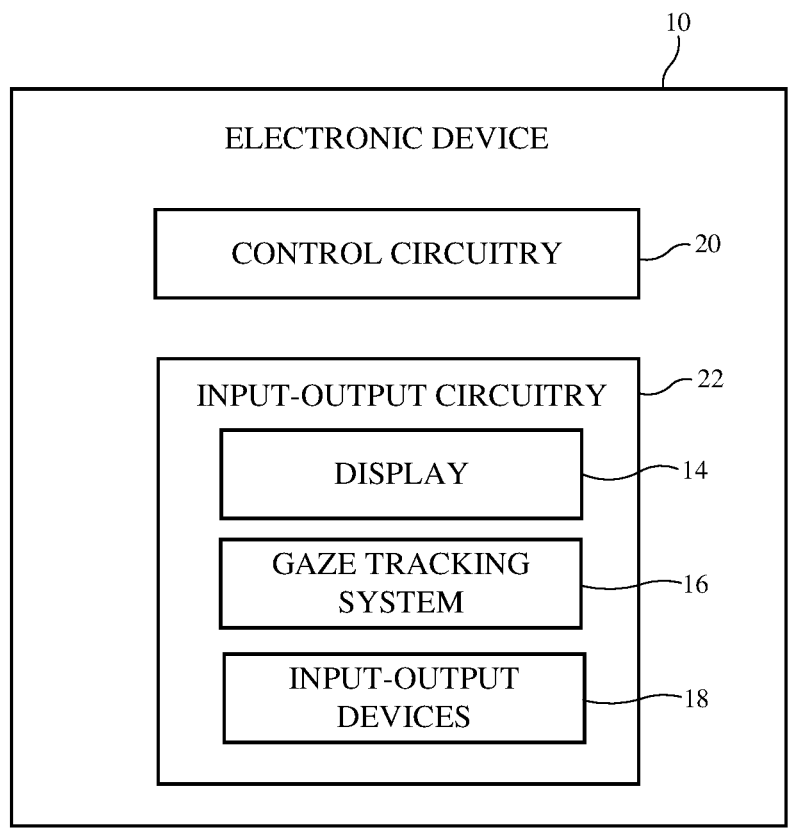
FIG. 1 is a schematic diagram of an illustrative head-mounted display in accordance with an embodiment.

A schematic diagram of an illustrative electronic device with a display and a gaze tracking system is shown in FIG. 1. Electronic device 10 may be a head-mounted device (head-mounted display), a cellular telephone, a tablet computer, a head-up display, a laptop or desktop computer, a television, a wrist watch, or other electronic equipment. As shown in FIG. 1, electronic device 10 may have control circuitry 20. Control circuitry 20 may include storage and processing circuitry for controlling the operation of device 10. Circuitry 20 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 20 may be based on one or more microprocessors, microcontrollers, digital signal processors, baseband processors, power management units, audio chips, graphics processing units, application specific integrated circuits, and other integrated circuits. Software code may be stored on storage in circuitry 20 and run on processing circuitry in circuitry 20 to implement control operations for device 10 (e.g., data gathering operations, operations involving the adjustment of components using control signals, operations involved in processing gaze tracking system data and data related to content being displayed for a user, etc.).

Device 10 may include input-output circuitry 22. Input-output circuitry 22 may be used to allow data to be received by device 10 from external equipment (e.g., a tethered computer, a portable device such as a handheld device or laptop computer, or other electrical equipment) and to allow a user to provide device 10 with user input. Input-output circuitry 22 may also be used to gather information on the environment in which device 10 is operating. Output components in circuitry 22 may allow device 10 to provide a user with output and may be used to communicate with external electrical equipment.

As shown in FIG. 1, input-output circuitry 22 may include a display such as display 14. Display 14 may be used to display images for a user of device 10. Display 14 may be an organic light-emitting diode display, a liquid crystal display, a liquid-crystal-on-silicon display, or any other suitable display. Display 14 may be opaque (e.g., when device 10 is a desktop computer or is a pair of virtual reality glasses) or may be transparent (e.g., when device 10 is a pair of augmented reality glasses, a head-up display, or other transparent display device). In configurations in which display 14 is a transparent display, a user may observe real-world objects through display 14 while computer-generated content is overlaid on top of the real-world objects by presenting computer-generated images on display 14. A transparent display may be formed form a transparent pixel array (e.g., a transparent organic light-emitting diode display panel) or may be a formed by a display device that provides images to a user through a beam splitter, holographic coupler, windshield, or other optical coupler (e.g., a display device such as a liquid crystal on silicon display).

Input-output circuitry 22 may include such as gaze tracking system 16. Gaze tracking (eye monitoring) system 16 may include image sensors, light sources, and/or other equipment that is used in monitoring the eyes of the user. Gaze tracking system 16 may include, for example, one or more visible and/or infrared cameras that face a user's eyes and capture images of the user's eyes. During operation of device 10, control circuitry 20 may use gaze tracking system 16 to track a user's gaze. Cameras and/or other sensors in system 16 may, for example, determine the location of a user's eyes (e.g., the centers of the user's pupils) and may determine the direction in which the user's eyes are oriented (the direction of the user's gaze, sometimes referred to as a measured point of gaze). By processing this information and information on the location of display 14, the location of the user's point of gaze on display 14 (sometimes referred to as the user's on-screen point of gaze) may be determined dynamically. Information on the location on display 14 where a user's gaze is currently directed and the amount of time that the user dwells on particular on-screen items may be used as a form of user input to system 10. Gaze tracking system output may also be used in conjunction with mouse clicks, screen taps and other touch screen or track pad touch gestures, voice commands, video game controller commands, and/or other user commands as a form of user input to device 10.

User input and other information may also be gathered using sensors and other input devices in input-output devices 18. Input-output devices 18 may include, for example, position and motion sensors (e.g., compasses, gyroscopes, accelerometers, and/or other devices for monitoring the location, orientation, and movement of device 10), may include force sensors, temperature sensors, touch sensors, buttons, capacitive proximity sensors, light-based proximity sensors, other proximity sensors, strain gauges, gas sensors, pressure sensors, moisture sensors, magnetic sensors, and other sensors, may include audio components such as microphones for gathering voice commands and other audio input, and may include speakers for providing audio output (e.g., for providing sound to the left and right ears of a user). If desired, input-output devices 18 may include haptic output devices (e.g., vibrating components), light-emitting diodes and other light sources, and other output components. Circuitry 22 may include wired and wireless communications circuitry that allows device 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
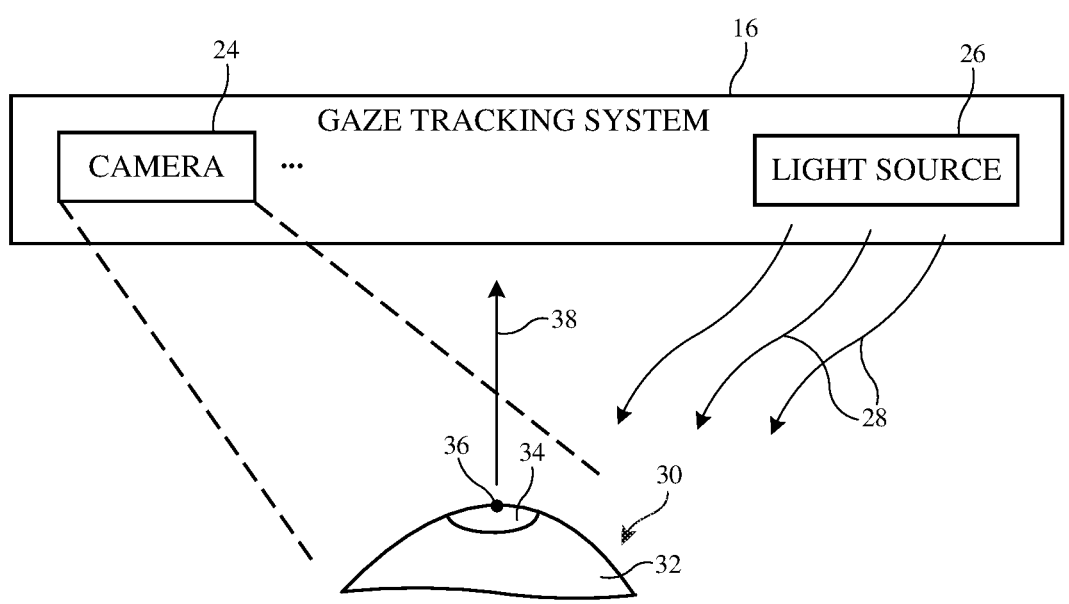
FIG. 2 is a top view of an illustrative head-mounted display in accordance with an embodiment.

FIG. 2 is a diagram showing how gaze tracking system 16 may gather eye position information on a user's eye 30. In a typical scenario, gaze tracking system 16 may include components for simultaneously monitoring two eyes such as eye 30 of FIG. 2.

As shown in FIG. 2, system 16 may include one or more image sensors such as camera(s) 24. Each camera may be focused on the front of a user's eye such as eye 30 so that the characteristics of the user's eye can be measured. One or more light-emitting diodes, lasers, lamps, and/or other light-emitting components may be used to form a light source for gaze tracking system 16 (see, e.g., light source 26).

During operation, light source 26 may emit light 28. For example, light source 26 may emit multiple beams of light 28 towards the user's eye 30 (e.g., 2-10 beams of light, 6 beams of light, 4-7 beams of light, 4-9 beams of light, etc.). Light 28 may be reflected off of the surface of eye 30. Camera 24 may gather images of eye 30. Information on the appearance of eye 30 (e.g., iris information, pupil information, blood vessel information, etc.) and/or information on reflected light (e.g., one or more light beams) from cornea 32 and other portions of eye 30 may be used by control circuitry 20 to determine the location of pupil center 36 of pupil 34 and the direction in which the user is currently gazing (gaze direction 38). The eye position information (pupil center information, eye orientation, etc.) that is gathered by gaze tracking system 16 and information on the location of display 14 relative to system 16 and eyes 30 may be used by control circuitry 50 to dynamically identify the user's point of gaze on display 14.

Figure 3:
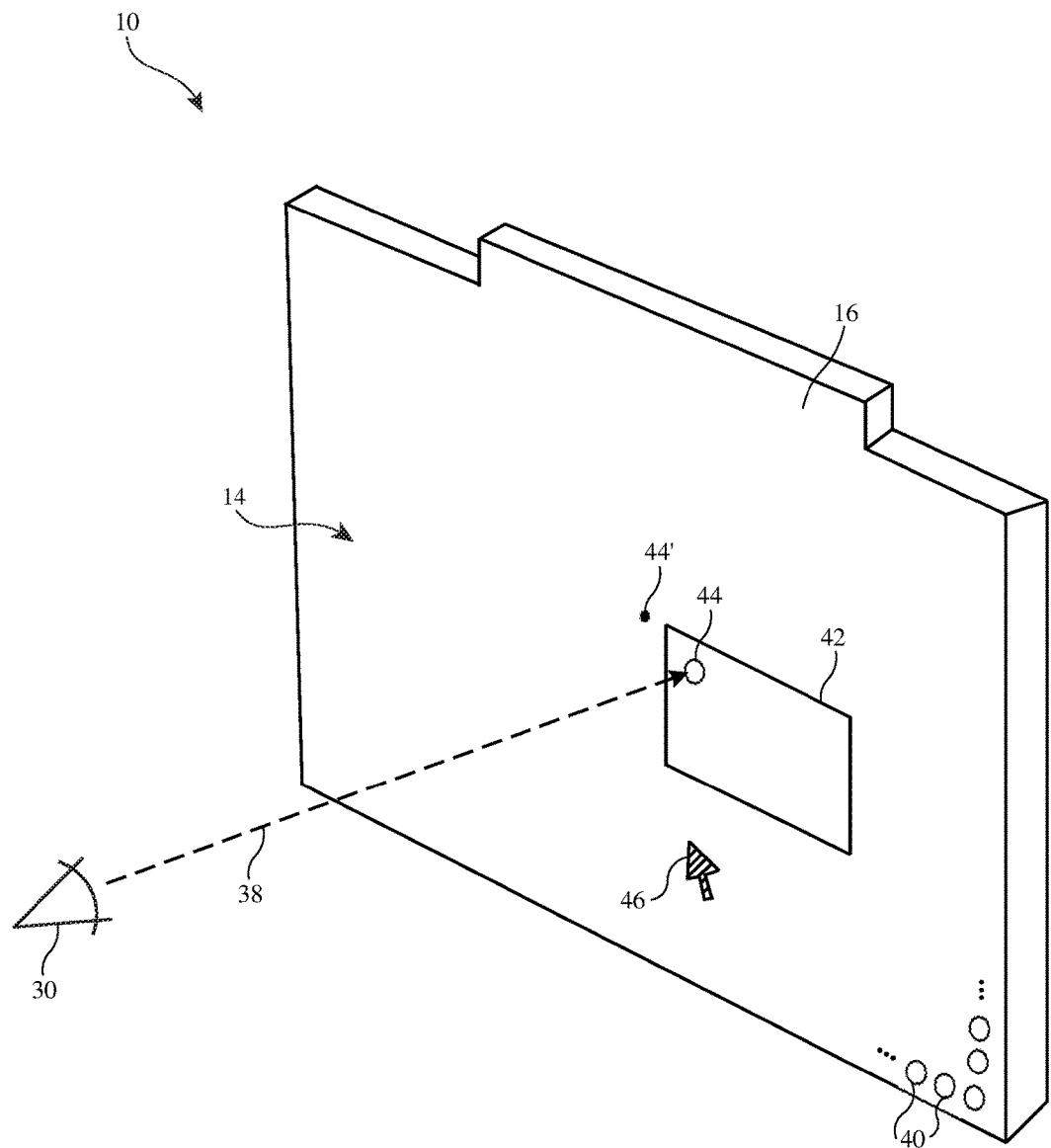
FIG. 3 is a perspective view of an illustrative display that is being used to display content for a user while the user's point of gaze on the display is being monitored using a gaze tracking system in accordance with an embodiment.

FIG. 3 is a perspective view showing how gaze tracking system 16 may be located at a known position relative to display 14 in system 10. As shown in FIG. 3, system 10 includes display 14. Display 14 has an array of pixels 40 for displaying images (text, graphics, video, and/or other on-screen content) for a user. Gaze tracking system 16 may be built into a display panel with pixels 40, may be enclosed within a separate housing that is mounted to display 14 or in a fixed relation to display 14, may be supported by a frame or other support structure associated with a head-mounted display (e.g., system 16 and display 14 may be supported by a frame or other head-mounted support structure that is configured to be worn on the head of a user), may be mounted to a portion of a vehicle or other system that includes display 14 (e.g., on a portion of a window or rear view mirror, on a portion of a vehicle body, etc.), may be mounted to a computer housing or other electronic device housing (e.g., along an upper edge of display 14 in a configuration in which device 10 is a desktop or laptop computer), or may be supported using other housings or support structures in device 10 (e.g., other support structures that allow the relative positions of display panel 14 and system 16 to be established and maintained). The fixed relationship between the positions of display 14 and system 16 allow the on-screen point of gaze of the user to be established based on eye measurements made with system 16.

During operation of device 10, information such as content 42 may be displayed on display 14 using the array of pixels 40 in display 14. In the example of FIG. 3, content 42 includes a rectangular window having at least one selectable object 44 (e.g., a clickable button for maximizing the rectangular window, a clickable button for closing the rectangular window, or other user selectable item). The selectable object may be located at the upper left corner of the rectangular window (as an example). An operating system, application, or other code running on device 10 may have knowledge of the location (e.g., the row and column location) of the pixels associated with selectable object.

As the user interacts with device 10, the user may use a mouse, track pad, touch screen sensor, or other input device to select items such as object 44. For example, a user may desire to maximize a window. The user may use a pointing device such as pointing device 46 or other input mechanisms to select (e.g., to "click on") object 44. Device 10 may monitor user input devices (e.g., input-output devices 18) such as mice, trackpads, etc. to determine when pointers such as pointer 46 have been positioned on top of selectable objects such as object 44 and to determine when the user has clicked on object 44.

During the process of moving a pointer such as pointer 46 on top of a selectable object of interest such as object 44 and/or during the process of selecting object 44 (e.g., by depressing a mouse button or trackpad at an appropriate time, by entering a voice input at an appropriate time, etc.), the user of device 10 will generally be observing object 44 closely. This behavior can be exploited by control circuitry 20 to ensure that the calibration of gaze tracking system 16 and device 10 are up to date.

Consider, as an example, a scenario in which a user is interacting with content 42 and object 44 of FIG. 3. During use of device 10, control circuitry 20 may use gaze tracking system 16 to monitor the user's gaze. Whenever system 16 determines from the output of system 16 that user gaze direction 38 is oriented in the general direction of object 44 and determines that the user is selecting object 44, control circuitry 20 can conclude that the user's actual on-screen point of gaze is directed towards the on-screen location associated with the pixels of object 44. Due to environmental changes, changes in the way in which the user is positioned relative to display 14, component drift, and other factors, the known mapping (calibration) between the output of gaze tracking system 16 (the user's measured eye position information and associated measure on-screen point of gaze) and the actual position of the user's on-screen point of gaze may drift apart. The currently measured on-screen point of gaze may, as an example, correspond to a location such as illustrative location 44' of FIG. 3 that is different than the user's actual on-screen point of gaze (the location of object 44). This may give rise to potential inaccuracies when device 10 takes actions based on the output of gaze tracking system 16.

To remove these potential inaccuracies, real time calibration operations may be performed. For example, each time the user's actual on-screen point of gaze can be determined (e.g., when it is known that the user is likely looking at the pixels 40 on display 14 that are associated with object 44 because the user has just clicked on object 44 and has a measured on-screen point of gaze that is within a predetermined threshold distance of object 44, etc.), this actual on-screen point of gaze can be compared to the measured on-screen point of gaze (the eye position information measured by system 16).

Real-time calibration operations may be performed by updating control circuitry 20 with information on discrepancies between the measured on-screen point of gaze determined from system 16 and the actual on-screen point of gaze. Any discrepancies between measured on-screen point of gaze 44' (measured eye position information) and actual on-screen point of gaze (the location of object 44) may be used to update gaze tracking calibration information maintained by control circuitry 20. The gaze tracking calibration information, which may sometimes be referred to as calibration data, gaze tracking system calibration data, eye position calibration information, etc.), includes information mapping eye position information on eyes 30 that is gathered using system 16 to on-screen point of gaze information. The eye position information may include information such as pupil center location, corneal reflections, and other measured output from system 16 that is indicative of the measured orientation of the user's point of gaze. When device 10 is calibrated, the actual on-screen point of gaze of the user can be determined by accurately mapping the measured eye position information to on-screen point of gaze information.

To enhance the accuracy of the calibration data (mapping of measured eye position information to on-screen point of gaze), calibration measurements may be performed dynamically during the operation of device 10. In particular, control circuitry 20 may continuously monitor for situations in which a user's on-screen point of gaze can be ascertained with confidence. These situations may arise, for example, when a user clicks on a particular on-screen object (and therefore is likely to be looking at the object) while the measured on-screen point of gaze is within a predetermined distance of the on-screen object, when a user's eyes follow a track or tracks associated with text at known locations (so that it can be reasonably assumed that the user's eyes were directed at the known text locations), when one or more on-screen objects are of particular visual interest and therefore form likely locations at which the user's point of gaze will dwell, and/or in other arrangements in which the user's gaze can be determined with a reasonably high certainty due to factors such as gaze location, gaze dwell time, gaze motion (e.g., movement from left to right through a line of text), and other situations when the user's on-screen point of gaze is known with reasonable certainty.

User input such as touch screen taps, user mouse clicks or track pad clicks, user voice commands, and other user selections can be used in determining where the user's gaze is directed. The relative importance of on-screen items (e.g., selectable buttons) may also be used in determining where the user's gaze is directed. For example, a user may not always view the movement of a mouse cursor across a screen, but will generally pay close attention to the location of the mouse cursor as the mouse cursor is being positioned over a window closing button and will almost certainly be looking at the location associated with the window closing button at the moment that the mouse is clicked to select the button. Multiple calibration measurements may be made and those that vary from expected calibration measurements (e.g., measurements that exceed predetermined thresholds) may be discarded (e.g., because they are likely associated with situations in which a user's gaze has shifted by the time a mouse button was clicked and therefore correspond to erroneous data).

Control circuitry 20 can analyze displayed content in real time to determine which portions of display 14 contain content of interest (e.g., selectable items and other salient features that will likely attract a user's gaze). Control circuitry 20 may, for example, generate a saliency map for display 14 (e.g., a probability density map in which features of visual interest are highlighted). The saliency map information, user input (clicks, voice commands, taps, etc.), and eye position information gathered from gaze tracking system 16 may then be processed to produce calibration information for device 10. The calibration information may be used to update the calibration of device 10 (e.g., the newly computed calibration data can be used to update the calibration settings for device 10 that are stored in storage in control circuitry 20). By updating the calibration information for device 10 in this way, device 10 can be continuously provided with up-to-date calibration data during normal operation.

Figure 4:
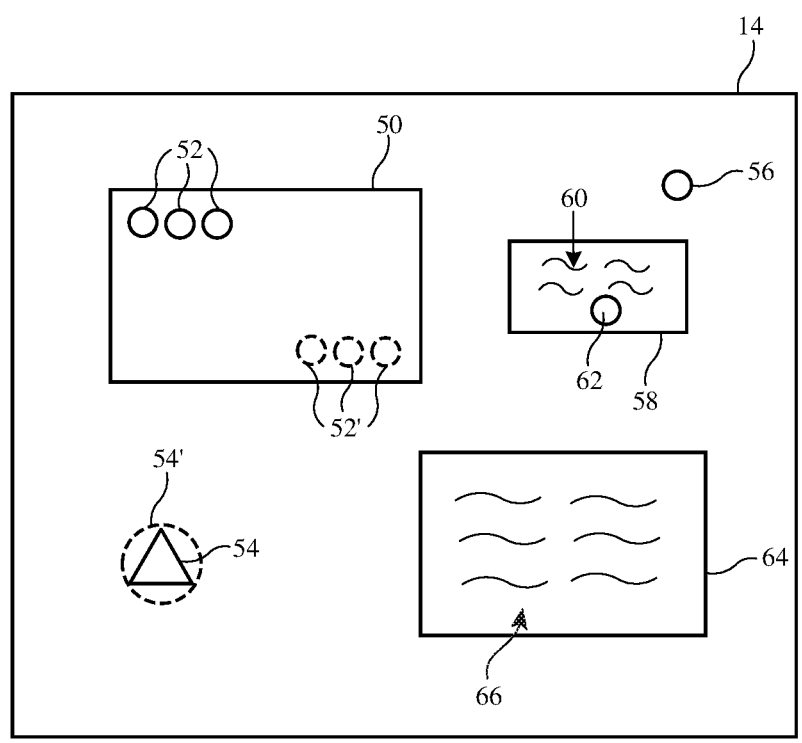
FIG. 4 is a diagram of an illustrative display on which content has been displayed in accordance with an embodiment.

FIG. 4 is a diagram of an illustrative display with content that may be analyzed in real time to help calibrate the gaze tracking capabilities of device 10. As shown in FIG. 4, device 10 may display content on display 14 such as movable window 50 (e.g., a window associated with an operating system file manager, etc.). Selectable objects such as buttons 52 may be located in the upper left corner of movable window 50. To help evenly distribute calibration points across the surface of display 14, it may be desirable for windows such as window 50 to occasionally or always be provided with selectable buttons in other location as illustrated by selectable buttons 52' at the lower right corner of window 50.

In some situations, control circuitry 20 can determine that particular content will be of visual interest to a user because the content has high contrast, bright colors, selectable regions, text, moving areas, or other attributes that provide the content with elevated visual interest. As an example, control circuitry 20 can analyze the information on display 14 and can determine that items such as illustrative objects 54 and 56 have high visual interest. A saliency map of the content on display 14 can be produced dynamically by using control circuitry 20 to analyze the content being display on display 14 in real time (see, e.g., illustrative on-screen point of gaze probability density function area 54' surrounding object 54, which indicates that object 54 has a high visual interest value). When a user's gaze dwells on display 14 in the vicinity of an area of highlighted saliency, control circuitry 20 can assume that the user's actual on-screen point of gaze is directed towards the area of highlighted saliency and can use this location information to update the calibration of device 10.

Illustrative item 58 of display 14 of FIG. 4 includes text 60 and selectable button 62. Text 60 may, for example, inform the user that the user should click on button 62 to help calibrate the gaze tracking functions of device 10. When the user clicks on button 62 (or other selectable object associated with the instructions of text 60), control circuitry 20 can assume that the user's on-screen point of gaze is overlapping button 60 and can calibrate device 10 accordingly.

If desired, on-screen content in device 10 may include items with text such as item 64 of FIG. 4. Item 64 may include one or more lines of text 66 at known locations. When a user's measured on-screen point of gaze is in the general location of text 66 and follows the pattern of text 66, control circuitry 20 can conclude that the user is reading text 66. As a result, control circuitry 20 will know the location of the user's gaze with reasonable certainty. Any discrepancies between the user's actual on-screen point of gaze and the user's on-screen point of gaze measured with gaze tracking system 16 can be used to update the calibration of device 10.

Figure 5:
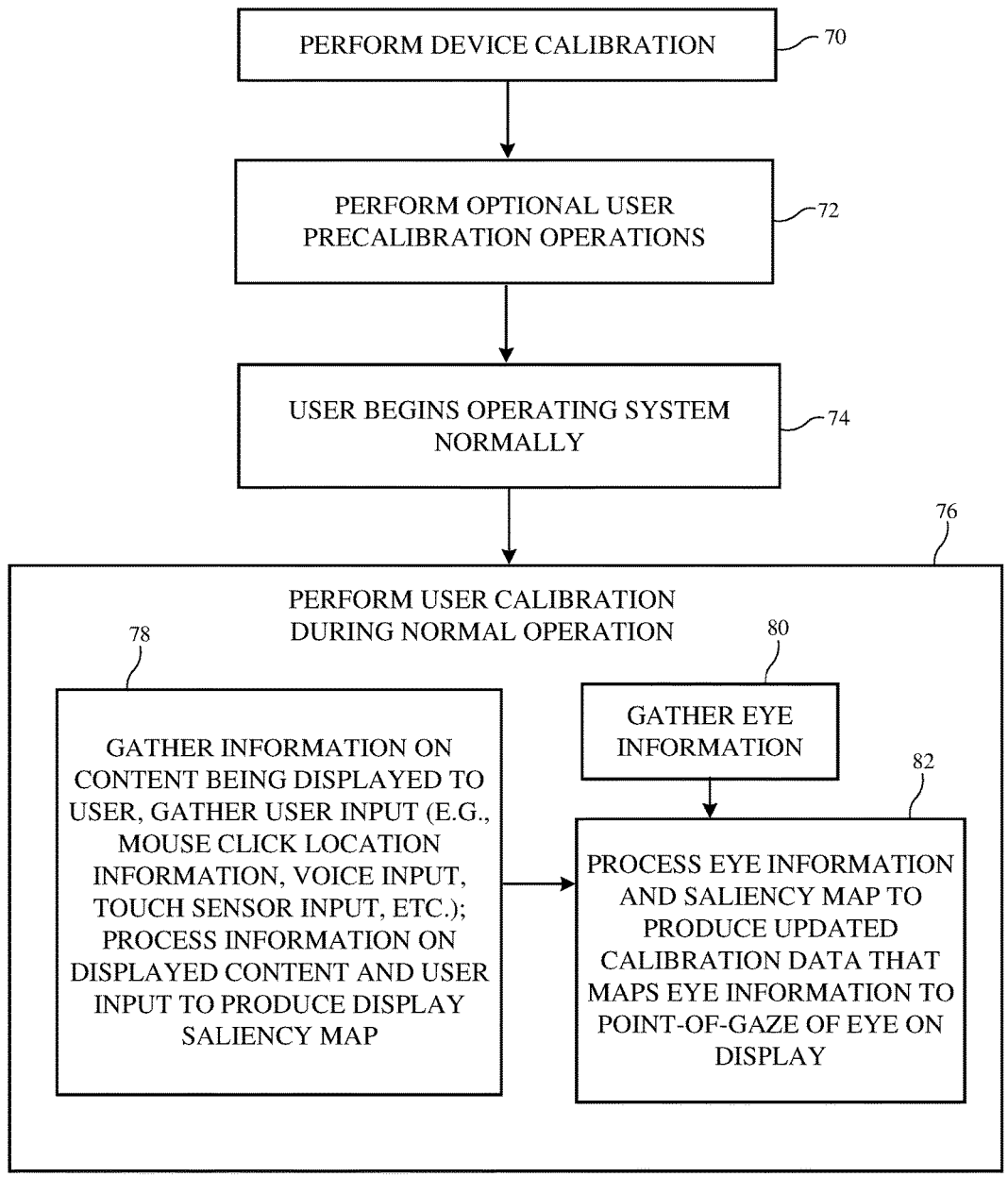
FIG. 5 is a flow chart of illustrative operations involved in calibrating a gaze tracking system during normal operation of an electronic device in accordance with an embodiment.

FIG. 5 is a flow chart of illustrative operations that may be performed during the use of device 10. As step 70, initial device calibration operations may be performed to ensure that control circuitry 20 is provided with information on the relative position of gaze tracking system 16 and display 14. If, as an example, gaze tracking system 16 and display 14 are housed in a common support structure (e.g., a support structure for a head-mounted display, etc.), factory calibration operations may be performed to inform control circuitry 20 of the location of display 14 on the support structure and the relative location of gaze tracking system 16 on the support structure. The information on the relative positions of display 14 and tracking system 16 can be loaded into storage in control circuitry 20. As another example, if gaze tacking system 16 is an accessory that is attached to the exterior of a computer housing or other housing for device 10, the device calibration of operations of step 70 may be initiated by a user when the user desires to inform control circuitry 20 of the relative position between system 16 and display 14 that has been established. The user may, for example, place an object in front of system 16 that is at a known position relative to display 14 to help calibrate device 10.

After device calibration 70, control circuitry 20 may perform optional user precalibration operations (step 72). The precalibration operations may involve use of on-screen instructions (see, e.g., instructions 60 of FIG. 4) that direct a user to click on an associated button (see, e.g., button 62). Instructions 60 and button 62 may be displayed at each of the four corners of display 14 or may otherwise be placed at a variety of locations across display 14 so that calibration data can be gathered at a diverse set of locations, corresponding to a diverse sets of measured eye orientations. At each calibration location, the user may use an on-screen pointer and mouse click or other user command to select button 62 (or other selectable on-screen item) to inform control circuitry 20 that the user is currently gazing at button 62. In response to each user command, gaze tracking system 16 can gather eye position information on the user's eyes, while knowing the location (the actual on-screen point of gaze) of the user's gaze (button 62). The user calibration operations of step 72 therefore allow control circuitry 20 to map measured on-screen point of gaze values to the known locations of buttons 62 (corresponding to actual on-screen point of gaze values), thereby calibrating gaze tracking system 16.

At step 74, the user of device 10 may begin interacting with device 10 normally. For example, a user may run an operating system on control circuitry 20, may use control circuitry 20 to launch an application, etc. The user of device 10 may play a computer game using device 10, may create documents, images, or other content, may run business or social media applications, may use a web browser to access on-screen content, and/or may otherwise use device 10 to access content of interest. During these normal device operations, content (images) may be displayed on display 14 and dynamic calibration operations may be performed.

As shown in FIG. 5, for example, control circuitry 20 may perform calibration operations during normal device operations (step 76). As content is being displayed on display 14, control circuitry may gather information on the content being displayed (e.g., the location of objects of visual interest such as buttons 52 and other items) and may gather user input. The information on the content being displayed may include information on button locations and the locations of other clickable on-screen objects, the locations of objects of visual interest, the locations of text, etc. User input may be gathered by input-output devices 18 and may include button clicks, on-screen tap (e.g., when a user is interacting with a touch screen display), taps on a trackpad, voice commands, etc. In some situations, gaze detection system 16 may detect that a user is viewing a particular object on display 14 for more than a predetermined amount of time. In situations such as these (e.g., when a user's gaze dwells at a particular on-screen point of gaze for more than a predetermined threshold amount), the dwelling of the user's gaze may serve as a type of user input, even in the absence of an associated mouse click or other user input from devices 18).

Control circuitry 20 may use the gathered information on the displayed content and the user input to produce a saliency map that identifies locations on display 14 that contain selectable buttons and other areas of visual interest (step 78). During the operations of step 80, control circuitry 20 may use gaze tracking system 16 to gather information on the measured on-screen point of gaze of the user. The measured on-screen point of gaze information from step 80 may be compared to the saliency map of step 78 during the operations of step 82. During step 82, control circuitry 20 may process eye position information from system 16 (e.g., measured positions on pupil center locations, measured corneal reflections, and other measured eye position information associated with the user's measured point of gaze) and information on the locations of objects of elevated visual interest on display 14 from the saliency map. It can be assumed that a user that is clicking on a button that is located in the vicinity of the user's measured point of gaze, is gazing at a particular object for more than a particular dwell time, is reading text in a particular portion of the display, or is otherwise exhibiting interest in particular portions of display 14 will be gazing at the objects highlighted in the saliency map. Control circuitry 20 can therefore create calibration data to enhance the accuracy of gaze tracking system 16 based on the known location of the user's point of gaze on display 14 (one of the highlighted objects in the saliency map) and the measured point of gaze. In particular, if there are any discrepancies between the measured on-screen point of gaze (measured eye position information) and the actual on-screen point of gaze (the location of an object of visual interest) that is inferred from the saliency map, control circuitry 20 can produce updated calibration data for system 16 and device 10. In this way, the calibration of device 10 may be maintained up to date during normal device operation with minimal interruptions for the user.

The foregoing is merely illustrative and various modifications can be made to the described embodiments. The foregoing embodiments may be implemented individually or in any combination.

What is claimed is:
1. An electronic device, comprising:
a display;
control circuitry that is configured to display content on the display during normal device operation and that is configured to produce a saliency map identifying a location of an object of visual interest in the displayed content, wherein the saliency map is a probability density map in which features of visual interest are highlighted; and
a gaze tracking system, wherein the control circuitry is configured to calibrate the gaze tracking system during normal device operation by comparing a measured on-screen point of gaze from the gaze tracking system to the location of the object of interest identified by the saliency map.

2. The electronic device defined in claim 1 wherein the gaze tracking system includes at least one light source and at least one camera.

3. The electronic device defined in claim 2 wherein the control circuitry is configured to display repositionable windows on the display and wherein the object of interest is a selectable button associated with a displayed repositionable window.

4. The electronic device defined in claim 2 wherein the object of interest comprises text.

5. An electronic device, comprising:
a display on which a selectable object is displayed;
a gaze tracking system that is configured to measure eye position information;
an input device that is configured to receive a command to select the selectable object; and
control circuitry that is configured to:
determine a first on-screen location based on the measured eye position information;
determine a second on-screen location at which the selectable object is displayed; and
in response to the input device receiving the command to select the selectable object and the first on-screen location being within a threshold distance of the second on-screen location, calibrate the gaze tracking system based on the measured eye position information and the second on-screen location.

6. The electronic device defined in claim 5 wherein the gaze tracking system comprises:
a light source configured to emit light; and
a camera configured to capture images containing reflections of the light.

7. The electronic device defined in claim 6 wherein the control circuitry is configured to produce the eye position information from the images.

8. The electronic device defined in claim 5 wherein the display comprises a head-mounted display.

9. The electronic device defined in claim 5 wherein the control circuitry is configured to produce a saliency map that identifies objects of visual interest in the content on the display and wherein the control circuitry is configured to identify the second on-screen location from one of the objects of visual interest identified in the saliency map.

* * * * *